United States Patent [19]
Wong et al.

[11] 3,893,618
[45] July 8, 1975

[54] THERMOSTATIC VALVE DEVICE HAVING NON-LINEAR FLOW CHARACTERISTICS

[75] Inventors: Backman Wong, Wayland; Earl L. Wilson, Wellesley, both of Mass.

[73] Assignee: Standard-Thomson Corporation, Waltham, Mass.

[22] Filed: Aug. 1, 1973

[21] Appl. No.: 384,519

[52] U.S. Cl. ............ 236/100; 137/625.3; 236/34.5; 251/118; 251/121; 251/205
[51] Int. Cl. .............................................. G05d 23/02
[58] Field of Search ......... 137/625.3; 251/118, 121, 251/205; 236/34, 34.5, 100

[56] References Cited
UNITED STATES PATENTS

| | | | |
|---|---|---|---|
| 2,891,574 | 6/1959 | Dahlberg | 137/625.3 |
| 3,010,695 | 11/1961 | Banks | 251/205 |
| 3,087,676 | 4/1963 | Neher, Jr. et al. | 236/34 |
| 3,182,911 | 5/1965 | Drapeau | 236/34 |
| 3,575,342 | 4/1971 | Puster | 236/34 |
| 3,722,545 | 3/1973 | Furlani | 137/625.3 |

*Primary Examiner*—William E. Wayner
*Assistant Examiner*—W. E. Tapolcai, Jr.
*Attorney, Agent, or Firm*—Jacox & Meckstroth

[57] ABSTRACT

A thermally responsive valve device having non-linear flow characteristics. The thermally responsive valve device includes movable and stationary valve structure. A movable valve member is movable to adjust the open area of a flow passage, but movement of the movable valve member provides a non-linear relationship between the area of the flow passage created and the distance of travel of the movable valve member. The movable and/or the stationary valve member is provided with an irregularly shaped portion so that with slight opening movement of the movable closure member less fluid flow than normal is permitted. As the movable valve member continues to move in an opening direction, the fluid flow increases at a predetermined non-linear rate until a specific flow rate is achieved. This operating characteristic eliminates or dramatically reduces temperature fluctuations in the system.

13 Claims, 15 Drawing Figures

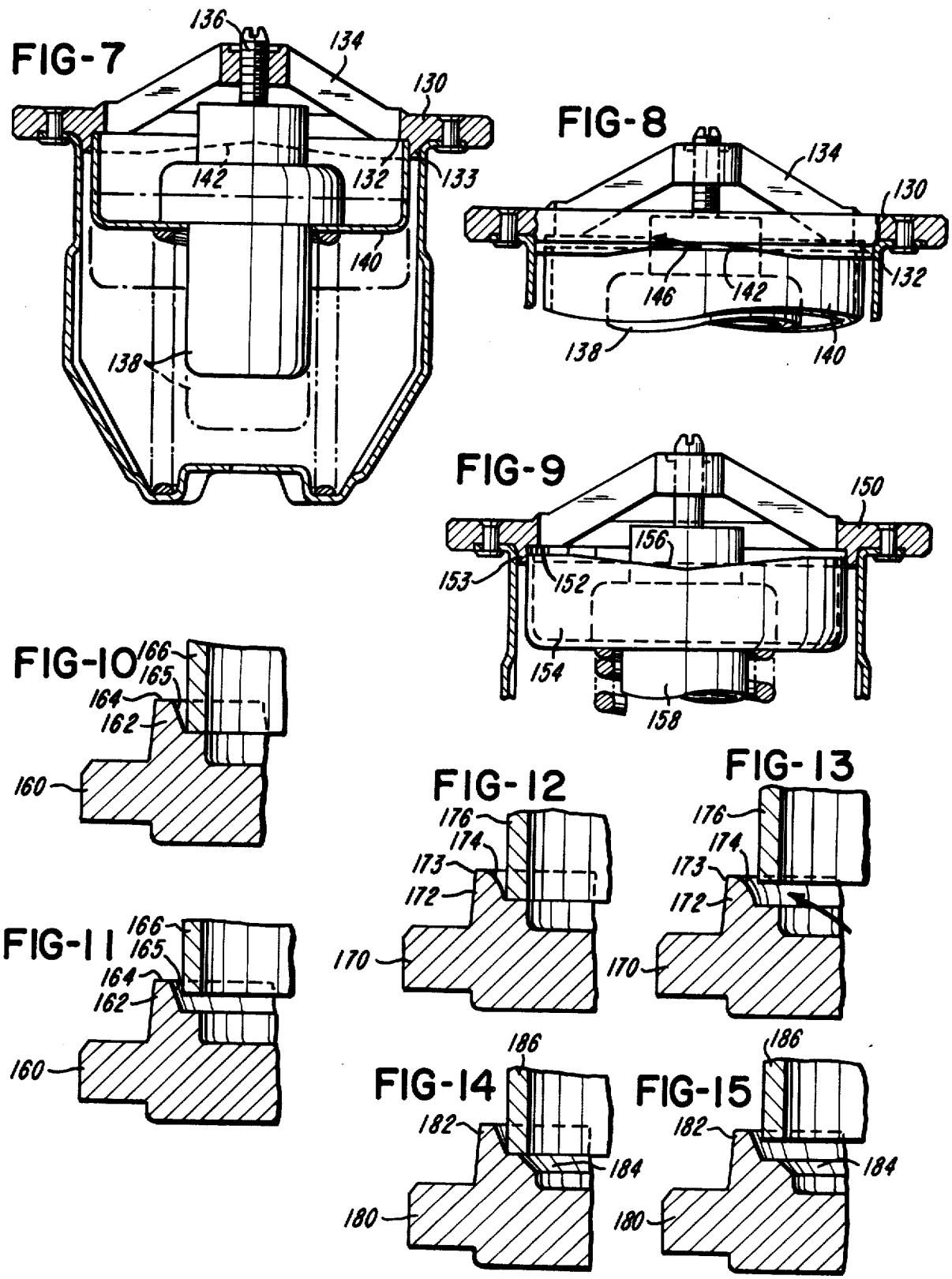

THERMOSTATIC VALVE DEVICE HAVING NON-LINEAR FLOW CHARACTERISTICS

BACKGROUND OF THE INVENTION

Thermally responsive valve devices are employed as the principal temperature control means in engine cooling systems. It is well known in the art that existing thermostatic valve devices during initial opening operation permit the temperature of the system controlled to fluctuate. Such fluctuations are undesirable. In an attempt to solve this problem, some thermally responsive valve devices have included means for regulating fluid flow at low fluid rates. U.S. Pat. Nos. 2,926,853 and 3,182,911 disclose thermally responsive valve devices which have multiple closure members. However, such multiple closure members, even though providing fluid control, do not provide good metering or fine regulation of fluid flow, required for temperature control stability under dynamic operating conditions.

It is an object of this invention to provide a thermally responsive fluid valve device which has such excellent regulation of fluid flow.

Other objects and advantages of this invention reside in the construction of parts, the combination thereof, the method of manufacture, and the mode of operation, as will become more apparent from the following description.

BRIEF DESCRIPTION OF THE VIEWS OF THE DRAWINGS

FIG. 7 is a longitudinal sectional view of another thermally responsive valve device of this invention.

FIG. 8 is a fragmentary elevational view, with parts shown in section, of the valve portion of the device of FIG. 7, showing the valve device in slightly open condition.

FIG. 9 is a fragmentary perspective view, with parts shown in section, of the valve portion of another thermally responsive valve device of this invention, showing the valve elements in a slightly open condition.

FIG. 10 is a fragmentary sectional view showing a part of the valve portion of another thermally responsive valve device of this invention.

FIG. 11 is a fragmentary sectional view showing the valve portion of the thermally responsive valve device of FIG. 10, showing the valve elements in a slightly open condition.

FIG. 12 is a fragmentary sectional view showing a part of the valve portion of another thermally responsive valve device of this invention.

FIG. 13 is a fragmentary sectional view showing the valve portion of the thermally responsive valve device of FIG. 12, showing the valve portion in a slightly open condition.

FIG. 14 is a fragmentary sectional view showing a part of the valve portion of another thermally responsive valve device of this invention.

FIG. 15 is a fragmentary sectional view showing the valve portion of the thermally responsive valve device of FIG. 14, showing the valve portion in a slightly open condition.

DETAILED DESCRIPTION OF THE PREFERRED EMBODIMENTS

Figure 1:
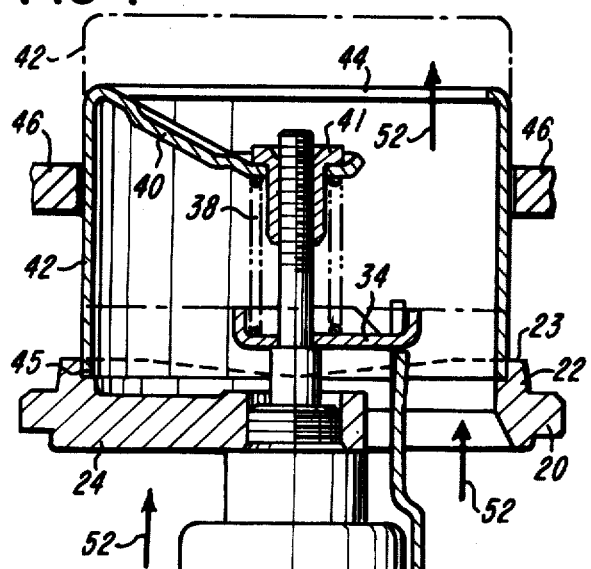
FIG. 1 is a longitudinal sectional view of a thermally responsive valve device of this invention in which a movable valve member is movable to adjust the area of a flow passage and in which movement of the movable valve member provides a non-linear relationship between the area of the flow passage and the distance of travel of the movable valve member.
Figure 2:
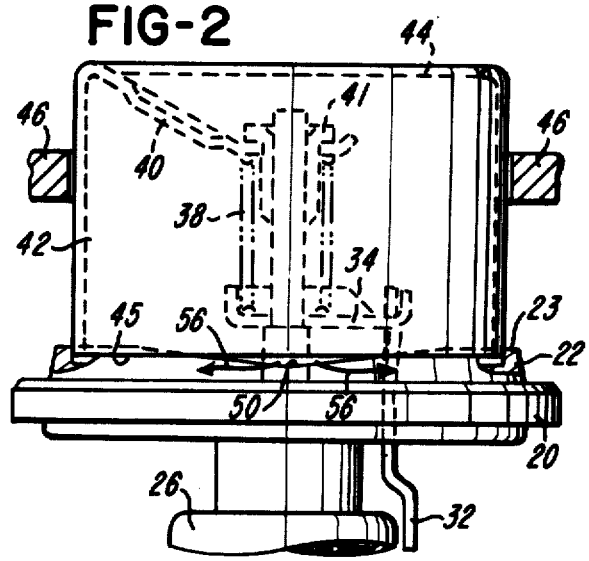
FIG. 2 is a fragmentary elevational view of the thermally responsive valve device of FIG. 1, showing the valve device in a slightly open position.

FIGS. 1 and 2 show a thermally responsive valve device of this invention in which a stationary member 20 has an annular valve seat portion 22 forming a fluid port. The valve seat portion has an annular flange 23 forming a recess. The stationary member 20 has an arm 24 which supports a thermally responsive actuator member 26, which may be of any suitable type, such as, for example, the type shown in U.S. Pat. Nos. 2,806,375 and 2,806,376.

A helical spring 30 encompasses the actuator member 26 and joins the actuator member 26 to a connector member 32, which is engaged by the spring 30. The connector member 32 extends through the fluid port in the stationary member 20 and is joined by a link 34 to an actuator stem 36 of the actuator member 26. The link 34 is shown as encompassing the actuator stem 36 and is engaged by a helical spring 38 which encompasses the stem 36 and engages an arm 40 which is carried by the stem 36. The arm 40 engages a nut 41 which is attached to the stem 36. The arm 40 extends from the stem 36 and joins a movable valve member in the form of a cup 42 which has an open upper end 44 and an annular closure portion 45 at the lower part thereof. The cup 42 is slidably encompassed by a horizontal wall 46.

The closure portion 45 of the cup 42 normally seats within the recess formed by the flange 23 in the valve seat portion 22, as shown in FIG. 1. The upper edge of flange 23 of the valve seat portion 22 has downwardly inclined or tapered portions 50 at opposite parts thereof.

Operation

The thermally responsive valve device of FIGS. 1 and 2 is of the type referred to as a by-pass valve device. Normally fluid flow exists through the device from the bottom to the top, as illustrated by arrows 52 in FIG. 1. Thus, fluid flows from the device outwardly through the upper open end 44 of the cup 42, and the fluid discharges to a region above the horizontal wall 46.

Some of the fluid which flows upwardly through the valve device engages the thermally responsive actuator member 26. If the temperature of the fluid which engages the thermally responsive actuator member 26 is above a given predetermined temperature, the actuator stem 36 moves upwardly and moves the cup member 42 upwardly. Such movement is against the forces of the spring 30.

As the cup 42 moves upwardly, the closure portion 45 thereof slidably moves upwardly within the flange 23. Due to the fact that the upper edge of the flange 23 has downwardly tapered portions 50, the lower edge of the cup 42 first moves past the lowermost part of the downwardly tapered portions 50. Thus, a small opening is first created at the lowermost part of each of the downwardly tapered portions 50 at the upper edge of the flange 23, and fluid flows outwardly therefrom, as illustrated by arrows 56 in FIG. 2. As the cup 42 continues to move upwardly, the fluid passage provided at each of the downwardly inclined parts 50 becomes gradually greater, and greater fluid flow between the cup 42 and the valve seat portion 22 is permitted. The fluid flows outwardly from the valve device into the space between the stationary member 20 and the horizontal wall 46. Ordinarily, means are provided by which upward movement of the cup 42 closes a port immediately above the cup 42, so that following maximum movement of the cup 42 upwardly, all of the fluid flowing through the fluid port within the stationary member 20 flows outwardly between the stationary member 20 and the cup 42.

When the temperature of fluid which engages the actuator member 26 decreases, the actuator stem 36 and the cup 42 are moved downwardly by the spring 30.

FIG. 3

Figure 3:
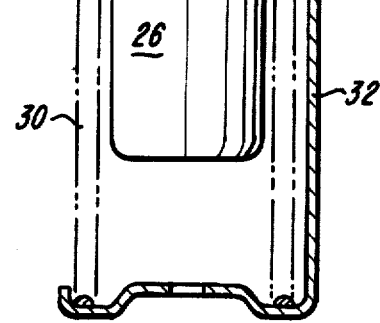
FIG. 3 is a fragmentary elevational view, with parts shown in section, of the valve portion of another thermally responsive valve device of this invention.

FIG. 3 shows another embodiment of the thermally responsive valve device of this invention. A stationary member 60 is provided with a fluid port 62. An arm 64 attaches a thermally responsive actuator member 66 to the stationary member 60. The stationary member 60 has a valve seat portion 67, provided with an annular flange 68. The flange 68 has an upper edge portion 69 which is straight or level. In a manner similar to that disclosed with respect to the embodiment of FIGS. 1 and 2, a cup member 70 is slidably positioned inside of the flange 68. The lower edge of the cup 70 is generally level but is provided with one or more upwardly inclined surfaces 72, which form one or more notches in the lower edge of the cup 70. Thus, as the actuator member 66 moves the cup 70 upwardly within the flanges 68, initial movement of the cup 70 upwardly creates a very small fluid passage in the notch formed by the surfaces 72. As the cup 70 continues to move upwardly, the fluid passage provided between the cup 70 and the upper edge 69 of the flange 68 gradually increases.

Figure 4:
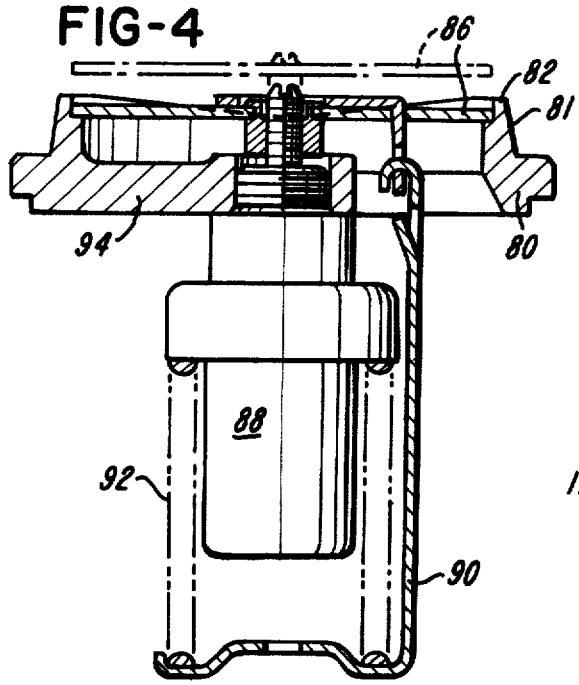
FIG. 4 is a longitudinal sectional view of another thermally responsive valve device of this invention.
Figure 5:
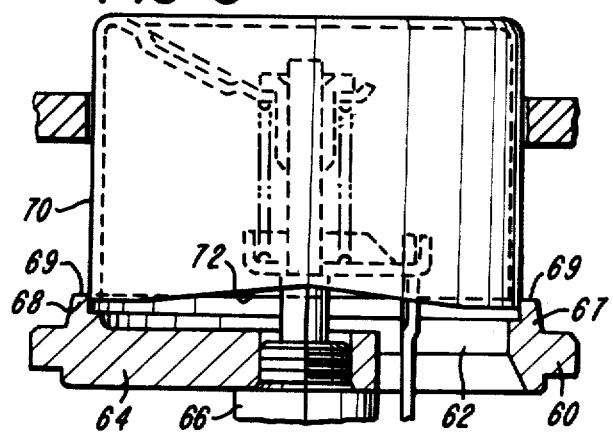
FIG. 5 is a fragmentary elevational view of the valve portion of the device of FIG. 4, showing the valve device in a slightly open condition.

FIGS. 4 and 5

FIGS. 4 and 5 show another embodiment of the thermally responsive valve device of this invention. A stationary member 80 is provided with a valve seat portion 81 which has a flange 82 having an upper edge which is provided with one or more downwardly inclined surfaces or portions 84. A movable closure member 86 is adapted to seat within the valve seat portion 81 and within the flange 82 to prevent flow of fluid upwardly from the thermally responsive device. The closure member is attached to a thermally responsive actuator 88 by means of a connector member 90 and a spring 92. The thermally responsive actuator member 88 is attached to the stationary member 80 by means of an arm 94. Upon increase in temperature of fluid engaging the thermally responsive actuator 88, the movable closure member 86 is moved upwardly by the actuator 88.

Fluid first flows through a small fluid passage which is provided between the movable closure member 86 and the lowermost part of the downwardly inclined surface or portion 84 at the upper edge of the flange 82, as illustrated by an arrow 100 in FIG. 5. As upward movement of the movable closure member 86 continues, a gradually increasing fluid passage is created.

FIG. 6

Figure 6:
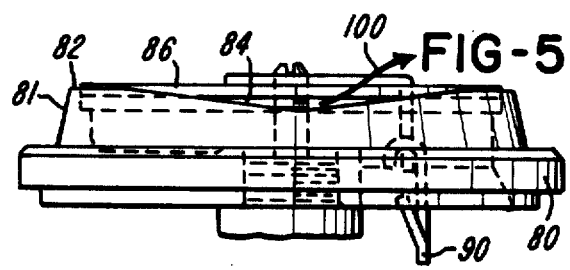
FIG. 6 is a fragmentary sectional view of the valve portion of another thermally responsive valve device of this invention.
Figure 6:
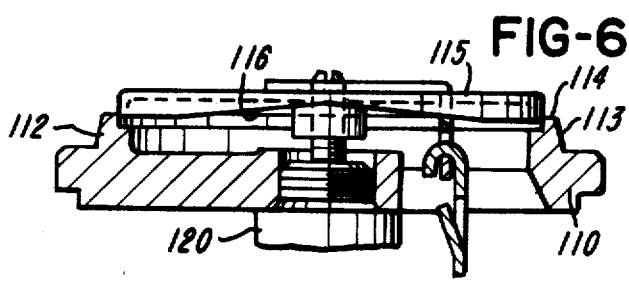

FIG. 6 shows another thermally responsive valve device of this invention. A stationary member 110 has a valve seat portion 112 provided with a flange 113 which has a level upper edge 114. A movable closure member 115 normally seats within the valve seat portion 112 and within the flange 113. The movable closure member 115 has a lower edge surface 116, a part of which is upwardly inclined. Thus, as a thermally responsive actuator member 120 moves the movable closure member 115 upwardly, as illustrated in FIG. 6, initial movement of the movable closure member 115 upwardly provides a very small fluid passage between the upper-most part of the lower edge surface 116 of the movable closure member 115 and the upper edge 114 of the valve seat portion 112.

FIGS. 7 and 8

FIGS. 7 and 8 show another embodiment of a thermally responsive valve device of this invention. The thermally responsive valve device in FIGS. 7 and 8 is provided with a stationary member 130 which has a lower portion thereof which is provided with an annular valve seat portion 132, within a flange 133. A bridge 134 extends slightly upwardly from the stationary member 130 and has attached thereto an actuator stem 136 of an actuator device 138. Attached to the actuator device 138 is a closure member 140. The lower edge surface of the valve seat portion 132 has an upwardly inclined portion 142. When the thermally responsive actuator 138 senses temperatures above a predetermined value, the thermally responsive actuator 138 moves downwardly and moves the closure member 140 downwardly. Initial movement of the valve closure member 140 downwardly creates a slight flow passage between the vertex of the inclined edge portion 142 of the valve seat portion 132 and the upper edge of the closure member 140 and fluid flows therefrom as illustrated by an arrow 146 in FIG. 8. Further downward movement of the closure member 140 creates a gradually increasing fluid flow passage between the valve seat portion 132 and the closure member 140, as illustrated in FIG. 8.

FIG. 9

FIG. 9 shows another embodiment of the thermally rsponsive valve device of this invention. A stationary member 150 is provided with a valve seat portion 152 having an annular flange 153. A closure member 154 normally seats within the valve seat portion 152 and within the annular flange 153.

The upper edge of the closure member 154 has one or more downwardly inclined portions 156. Thus, as a thermally responsive actuator member 158 moves the closure member 154 downwardly, initially a very small flow passage is created between the downwardly inclined edge 156 of the closure member 154 and the lower edge surface of the valve seat portion 152, as illustrated in FIG. 9.

FIGS. 10 and 11

FIGS. 10 and 11 show a modification in the valve seat portion of a thermally responsive valve device of this invention. A stationary member 160 is provided with a valve seat portion 162 having an annular flange 164. The inner surface of the annular flange 164 has an inclined wall surface or upwardly sloping portion 165 along at least a part thereof. An actuator member not shown, is attached to a closure member 166 for movement thereof. Initial upward movement of the closure member 166 within the flange 164 provides a very small flow passage along at least a portion of the periphery of the closure member 166, between the sloping portion 165 and the lower edge of the closure member 166. As the closure member 166 moves gradually upwardly, the spacing between the inclined wall surface 165 and the lower edge of the closure member 166 gradually increases and provides a gradually increasing fluid flow passage for flow of fluid between the lower edge of the closure member 166 and the inclined surface 165 of the valve seat portion 162, as illustrated in FIG. 11.

FIGS. 12 and 13

FIGS. 12 and 13 show another modification in the valve seat portion of a thermally responsive valve device of this invention. A stationary member 170 has a valve seat portion 172 provided with an annular flange 173 which has an upwardly curved or arcuate inner surface 174 along at least a portion of the flange 173. A movable closure member 176 is adapted to seat within the valve seat portion 172. As a thermally responsive actuator member, not shown, moves the movable member 176 upwardly, initial movement of the closure member 176 upwardly results in very limited fluid flow, at least at a portion of the lower surface or edge of the closure member 176. As illustrated in FIG. 13, further upward movement of the closure member 176 permits increased fluid flow between the closure member 176 and the valve seat portion 172. Such flow is in a pattern which is different in characteristics from the flow pattern obtained as the closure member 166 moves upwardly with respect to the valve seat 162 in the device shown in FIGS. 10 and 11.

FIGS. 14 and 15

FIGS. 14 and 15 show another modification in the valve seat portion of a thermally responsive valve device of this invention. A stationary member 180 is provided with a valve seat portion 182. The stationary member 180 also has an inclined or tapered entry portion 184 directly below the valve seat portion 182. A movable closure member 186 is adapted to seat within the valve seat portion 182. As the movable closure member 186 moves slightly upwardly from the valve seat portion 182, a very small and controlled fluid flow passage is created between the closure member 186 and the valve seat portion 182. The inclined portions 184 which leads to the valve seat portion 182 provides a type of flow pattern between the closure member 186 and the valve seat portion 182 which is not otherwise obtained.

SUMMARY

It is to be understood that the vertex in any of the inclined portions or notches discussed above and shown in the drawings may have a definite point, or the vertex may be an extending upper or lower part of the surface which is less definable. The thermally responsive valve device of this invention provides means by which initial fluid flow through a thermally responsive valve device can be controlled and regulated on a predetermined basis to provide non-linear metering of the fluid flow. Such metering or accurate regulation of the fluid flow provides a much more stable temperature control than could otherwise be obtained in a thermally responsive valve device. Furthermore, such accurate fluid flow control and regulation permits great flexibility and possibilities in the modification of total temperature control range of a thermally responsive valve device.

It is also to be understood from the embodiments of this invention as disclosed herein that various types of notches or inclined portions or arcuate portions may be provided on valve seat portions or on closure members in numerous types of thermally responsive valve structures of this invention. Furthermore, the inclined or tapered or arcuate portions which provide a very small opening at initial movement of a closure member, may have various angles, slopes, or inclinations or edge curvature or the like. Furthermore, one or more inclined or curved edge surfaces may be provided in a stationary member and/or in a movable closure member in order to provide fine metering or regulation of fluid flow through more than one opening or a plurality of openings, as an inclined surface or curved surface structure exists in a movable closure member and/or in a stationary closure member. Thus, a thermally responsive valve device of this invention includes structure by which movement of a movable valve member provides a non-linear relationship between the area of the fluid passage created and the distance or length of travel of the movable valve member.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. A thermally responsive fluid flow control valve device for elimination of temperature fluctuations during initial opening operation comprising:
   a stationary valve member having an annular valve seat portion forming a fluid port,
   a linearly movable valve member having a closure portion normally engaging the valve seat portion to close the fluid port and movable with respect thereto,
   the stationary valve member including an annular flange encompassing the valve seat portion, the annular flange being substantially parallel with the line of movement of the movable valve member, the flange having an end spaced from the annular valve seat portion, the end having an inclined part so that initial movement of the movable valve member creates a small fluid flow passage between the inclined part and the movable valve member and increased movement of the movable valve member is non-linear with respect to the fluid flow passage created, thermally responsive actuator means,
means joining the thermally responsive actuator means to the movable valve member for movement thereof with respect to the stationary valve member.

2. Thermally responsive valve structure comprising:
a thermally responsive actuator,
a stationary valve member provided with a substantially flat annular valve seat surface forming a fluid port, an annular flange having a substantially cylindrical inner surface surrounding the valve seat surface, the flange having an annular edge portion spaced from the valve seat surface,
a movable valve member having a closure portion slidable within said cylindrical inner surface of the annular flange and engageable with the annular valve seat surface to close the fluid port,
at least one of said portions being provided with a notch part, so that as the movable valve member moves in a direction from the valve seat surface, a fluid passage of limited area is created between one valve member and the notch part of the other valve member,
and means attaching the thermally responsive actuator to the movable valve member for movement thereof with respect to the stationary valve member.

3. The thermally responsive valve structure of claim 2 in which the notch part is in the edge portion of the flange which encompasses the valve seat surface of the stationary valve member.

4. The thermally responsive valve structure of claim 2 in which the notch part is in the closure portion of the movable valve member.

5. A thermally responsive fluid flow control valve device for elimination of temperature fluctuations in the fluid during initial opening operation comprising:
a stationary valve member having an annular valve seat portion forming a fluid port,
a movable valve member having a closure portion normally in engagement with the annular valve seat portion and closing the fluid port and movable with respect thereto,
the stationary valve member having an annular flange encompassing the valve seat portion and forming a recess within which the annular valve seat portion is located and within which the closure portion of the movable valve member is slidably movable, the annular flange of the stationary valve member having an end spaced from the valve seat portion and provided with a sloping part so that initial movement of the movable valve member with respect to the stationary valve member creates a small fluid flow passage between the flange and the movable valve member, and increased movement of the movable valve member is non-linear with respect to the fluid flow passage created between the flange and the movable valve member,
thermally responsive actuator means,
and means joining the thermally responsive actuator means to the movable valve member for movement thereof with respect to the stationary valve member.

6. The thermally responsive valve structure of claim 2 in which the valve seat surface of the stationary valve member is encompassed by said flange forming a recess within which the closure portion of the movable valve member is positioned to close the fluid port, the flange having said annular edge portion, the closure portion of the movable valve member having a peripheral edge provided with said notch part so that as the closure portion of the movable valve member moves outwardly from the recess, a small fluid passage is created between the notch part of the peripheral edge of the closure portion of the movable valve member and the annular edge portion of the flange of the valve seat surface of the stationary valve member.

7. The thermally responsive valve device of claim 5 in which the annular flange which forms the recess has a peripheral edge provided with a part which is inclined.

8. The thermally responsive valve device of claim 5 in which the annular flange has an inclined wall surface within the recess and extending along at least a portion of the flange, so that as the closure portion of the movable valve member moves in a direction from the recess, a limited fluid passage is created between the movable valve member and the inclined wall surface.

9. The thermally responsive valve device of claim 8 in which the inclined wall surface is arcuate 10. Thermally responsive valve structure comprising:
a thermally responsive actuator,
a stationary valve member provided with an annular valve seat surface and forming a fluid port, a flange encompassing the valve seat surface and having an internal cylindrical surface substantially normal thereto,
a hollow cylindrical movable valve member having a closure portion at one end thereof which is engageable with the annular valve seat surface to close the fluid port, said one end of the hollow cylindrical movable valve member being movable within the flange and slidably engageable with the internal cylindrical surface of the flange,
the internal cylindrical surface of the flange having a central axis which is substantially coaxial with the axis of the cylindrical movable valve member, the flange having a sloping end surface spaced from the valve seat surface, so that as the movable valve member moves in a direction from the valve seat surface a fluid passage of limited area and of gradually increasing area is created between the closure portion of the movable valve member and the sloping end surface of the flange of the stationary valve member,
and means attaching the thermally responsive actuator to the movable valve member for movement thereof with respect to the stationary valve member.

11. Thermally responsive valve structure comprising:
a thermally responsive actuator,
a stationary valve member provided with a substantially flat annular valve seat surface forming a fluid port, the stationary valve member including a cylindrical flange having a substantially cylindrical inner wall surface encompassing the valve seat surface, the cylindrical flange having an end portion spaced from the valve seat surface,
a movable valve member having a closure portion in slidable engagement with the cylindrical inner wall surface of the flange of the stationary valve member and engageable with the valve seat surface to close the fluid port, the end portion of the flange of the stationary valve member having a notch part so that as the movable valve member moves in a direction from the valve seat surface a fluid passage of limited area is created between the movable valve member and the notch part of the flange of the stationary valve member, and means attaching the thermally responsive actuator to the movable valve member for movement thereof with respect to the stationary valve member.

12. The thermally responsive valve structure of claim 11 in which the movable valve member is a hollow cylindrical member open at each end thereof, a wall encompassing the movable valve member and slidably engaged thereby.

13. The thermally responsive valve structure of claim 11 in which the movable closure member is substantially flat.

* * * * *

UNITED STATES PATENT OFFICE
CERTIFICATE OF CORRECTION

PATENT NO. : 3,893,618
DATED : July 8, 1975
INVENTOR(S) : Backman Wong and Earl L. Wilson It is certified that error appears in the above—identified patent and that said Letters Patent are hereby corrected as shown below:

Page 1, Column 1:

Add the following at the end of "References Cited":

FOREIGN PATENTS OR APPLICATIONS

W 36 884/46.c       7/1958       Germany...........236/100

Signed and Sealed this

Twenty-third Day of November 1976

[SEAL]

Attest:

RUTH C. MASON
Attesting Officer

C. MARSHALL DANN
Commissioner of Patents and Trademarks